United States Patent [19]
Charlton

[11] 3,779,653
[45] Dec. 18, 1973

[54] TRAILER HITCH

[76] Inventor: William D. Charlton, 614 Second St., Cheney, Wash. 99004

[22] Filed: Nov. 8, 1971

[21] Appl. No.: 196,521

[52] U.S. Cl. ............................... 403/3, 403/122, 403/315, 280/512
[51] Int. Cl. ........................................... F16c 11/06
[58] Field of Search.................... 280/504, 512, 511, 280/513, 515; 287/90 D

[56] References Cited
UNITED STATES PATENTS

| | | | |
|---|---|---|---|
| 3,479,057 | 11/1969 | Miller | 280/511 |
| 2,697,618 | 12/1954 | Hulstedt | 280/515 |
| 2,431,694 | 12/1947 | Johnson | 280/504 |

FOREIGN PATENTS OR APPLICATIONS

| | | | |
|---|---|---|---|
| 300,750 | 11/1928 | Great Britain | 280/515 |

*Primary Examiner*—Andrew V. Kundrat
*Attorney*—Greek Wells et al.

[57] ABSTRACT

A trailer hitch for a towing vehicle, providing the capability for towing trailing vehicles having either ball and socket or ring and pintle hitching arrangements. The hitch includes a base which supports an upright pintle and a movable ring retaining bracket. When a ring and pintle hitching arrangement is required, the towing ring on a trailing vehicle is placed over the pintle. The retaining bracket is then moved and locked into an operative position preventing the ring from becoming disengaged while in tow. When a ball and socket hitching arrangement is required, the retaining bracket is pivoted and locked into an inoperative position. The socket of a trailing vehicle may then be moved into engagement with a ball formed at the upper end of the pintle.

1 Claim, 7 Drawing Figures

3,779,653

1

TRAILER HITCH

BACKGROUND OF THE INVENTION

Several types of hitch assemblies are presently in use for operatively connecting towing vehicles to trailing vehicles. Hitch assemblies utilized for towing on roadways are generally of a standard ball and socket type while couplings utilized primarily for off-road towing usually involve ring and pintle arrangement.

In the past, vehicles which were designed for off-road towing could seldom be utilized for towing on roadways at reasonable speeds. Further, vehicles utilized for towing on roadways were not usually designed for towing purposes off roadways for reasons including lack of power, ground clearance, etc. Therefore, there seldom existed a need for hitch assemblies other than those designed specifically for one type of hitching arrangement.

Advancements in the auto and truck industries, however, have greatly increased the versatility of towing vehicles thereby providing capability for efficient towing either on or off roads. This advancement has created difficulty in that both the ring and socket hitches are still in prominent use, each requiring a different type of hitching arrangement on the towing vehicle.

The present invention was conceived to eliminate the above described difficulty by providing a hitch device attachable to towing vehicles for accommodating either a ring or a socket to form an operable link between towing vehicles and trailers.

The device includes a base fixed at one end to the towing vehicle and projecting outwardly to support a pintle having a ball integrally formed at its upper end. A pivotable bracket is located adjacent the pintle for movement to an operative position preventing disengagement when the hitch is utilized as a ring and pintle type hitch. The retaining bracket is also movable to an inoperative position facilitating engagement of the ball by a socket to form a ball and socket type hitch.

Related prior patents include:

| 3,385,611 | Silver | 3,326,576 | Kothmann |
|---|---|---|---|
| 3,522,958 | Lusignan | 3,827,307 | Osborn |
| 3,479,057 | Miller | 2,872,213 | Hosford |
| | 2,940,775 | Farrow et al. | |

Osborn's device incorporates a horizontally rotatable plate fixed to a towing vehicle having several different towing hitches fixed thereto, the plate being selectively rotated to an operative position to accommodate matching connectors on trailer vehicles.

Hosford's device is utilized to provide two different size ball hitches each of which may be selectively pivoted about a horizontal axis to an operative position thereby accommodating either of two different sized trailer sockets.

Silver's patent discloses a hitching device utilizing a vertically aligned ball and pintle for simultaneously engaging a vertically aligned socket and ring assembly for a trailer.

Kothman's patent similary discloses a double coupling utilizing a ball and socket simultaneously with a ring and pintle coupling Farrow's disclosure basically describes an adapter utilized to extend between draft and drawn vehicles enabling trailers with socket hitches to be coupled to towing vehicles having drawbar type hitches.

2

The remaining patents granted to Miller and Lusignan describe safety devices for use with ball and socket type couplings.

SUMMARY OF THE INVENTION

The present invention basically comprises a vehicle trailer hitch to be attached to a towing vehicle and adapted to facilitate engagement by either a ring or a socket of a trailing vehicle. The device includes a base supporting an upright post having a ball formed at the upper end. The post is adapted to be encircled by a ring, and the ball by a socket on a trailing vehicle. A bracket is pivotably mounted to the base inwardly from the post and ball for selective manual movement between an operative position, where an integral arm extends over the base to position adjacent the ball, and a second position with the arm clear of the ball. A latching means is provided on the bracket to facilitate manual locking at either position.

A first object of my invention is to provide a trailer hitch that may be quickly and easily adjusted to accommodate either a socket or a ring of a trailing vehicle.

An additional object is to provide such a trailer hitch having immovable connector elements, thereby eliminating the need for movable or adjustable mounts on either hitch element.

A further object is to provide such a trailer hitch that is relatively inexpensive and simple to construct.

These and further objects and advantages will become apparent from the following disclosure, taken with the accompanying drawings, which illustrate two alternate preferred embodiments of the invention.

DESCRIPTION OF THE PREFERRED EMBODIMENTS

Figure 1:
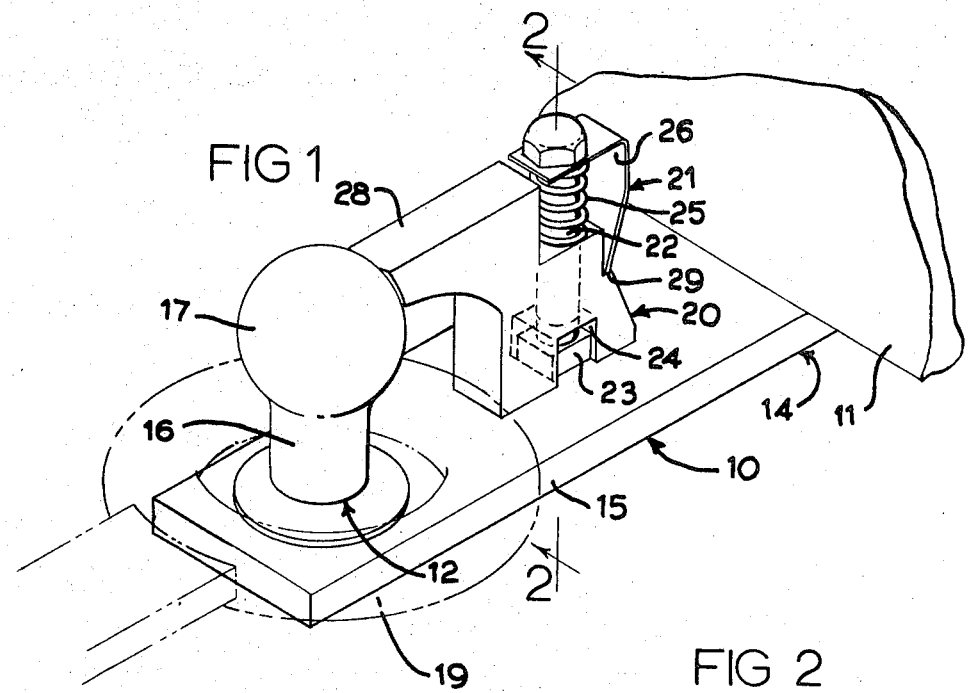
FIG. 1 is an isometric view illustrating one embodiment of my invention, its components and their relation to one another.
Figure 2:
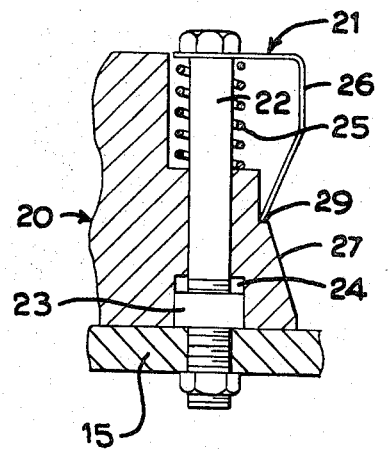
FIG. 2 is a sectional elevation view of the locking mechanism of my invention taken along line 2—2 in FIG. 1.

Referring now to the accompanying drawings, a trailer hitch basically comprising my invention may be viewed as indicated by the reference numeral 10. Hitch 10 is designed to be rigidly affixed to a towing vehicle 11 for effectively providing engagement with either a socket or ring towing member on a trailing vehicle.

The hitch 10 generically includes a base 14 for mounting to towing vehicles. A rearward extension 15 of base 14 provides rigid support to an upwardly projecting standard 12. A ball 17 and pintle 16 are integrally formed at the upper end of standard 12. Ball 17 is utilized for engaging a socket 18 (FIGS. 4 and 5) at the forward end of a trailing vehicle (not shown). The pintle 16 is designed to be encircled by a ring 19 (FIGS. 1 and 6) of a trailing vehicle.

Figure 5:
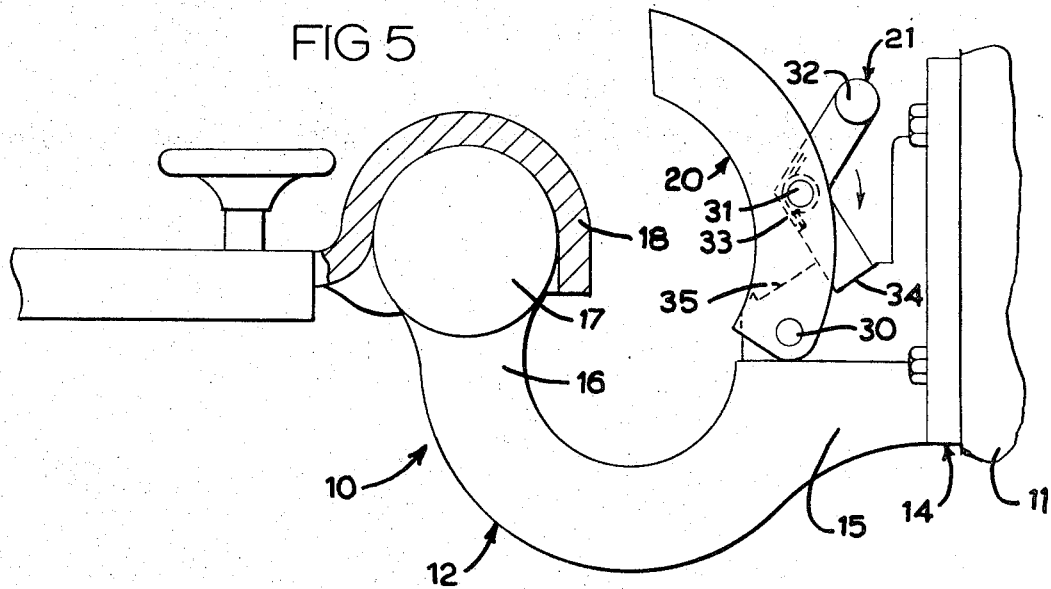
FIG. 5 is a side elevation view of an alternate form of my invention engaged by the socket of a trailing vehicle.
Figure 6:
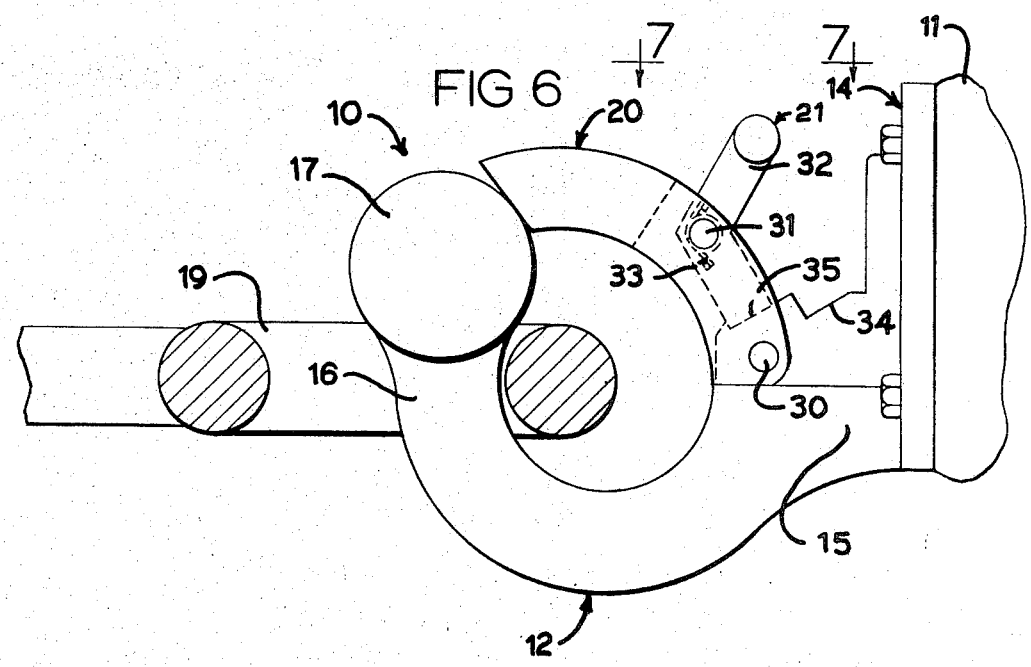
FIG. 6 is a view similar to FIG. 5 showing the hitch engaged by the ring of a trailing vehicle.

When utilized for engagement with a ring 19, a pivotable bracket 20 is moved and locked, by a latching mechanism 21, into an operative position as viewed in FIGS. 1 and 6. Bracket 20, in this position, creates partial enclosure to prevent ring 19 from becoming disengaged from pintle 16 while in tow. In order for ball 17 to accommodate a socket 18, bracket 20 is pivoted and locked at an inoperative position as viewed in FIGS. 4 and 5.

FIGS. 1-4 illustrate in detail a first embodiment of my invention. Base 14 of this embodiment is a substantially horizontal elongated bar, fixed to the underside of towing vehicle 11. integral extension 15 of base 14 protrudes rearwardly from vehicle 11 to provide support for bracket 20 and standard 12 at the rearward end thereof. Bracket 20 is located on extension 15 between standard 12 and vehicle 11 for selective pivotal movement about the vertical axis of a bolt 22 which is parallel to the vertical axis of standard 12 and spaced inwardly therefrom along the longitudinal center of vehicle 11. An arm 28 extends from the uppermost portion of bracket 20 to span the distance between bolt 22 and the exterior surface of ball 17 when bracket 20 is in the operative position illustrated in FIG. 1. In this operative position, arm 28 completes a partial closure, with bracket 20, standard 12 and extension 15 being the sides thereof.

Bracket 20 is downwardly biased by a compression spring 25 mounted between the head of bolt 22 and a horizontal portion of bracket 20 located vertically below. A spring clip 26 is also mounted adjacent the head of bolt 22 and is vertically supported by spring 25. Clip 26 extends outwardly, then downward to engage bracket 20 along a ledge 29 (FIG. 2). ). Clip 26, when engaging ledge 29, prevents vertical movement of bracket 20 on bolt 22 by completing a substantially rigid connection between bracket 20 and bolt 22. Clip 26 may, however, be manually disengaged from ledge 29 and allowed to slidably engage a downwardly inclined surface 27 of bracket 20 as it is raised (FIG. 3) prior to being pivoted to either the operative or inoperative position.

Figure 3:
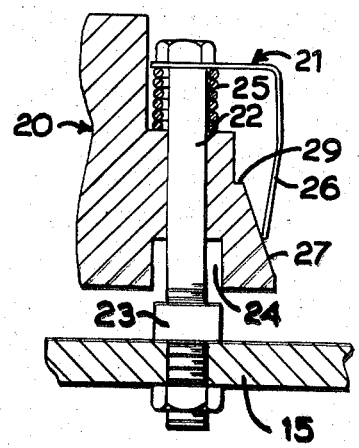
FIG. 3 is a view similar to FIG. 2 illustrating the locking mechanism in a raised, pivotable position.

In the raised position, as viewed in FIG. 3, the side walls of a rectangular opening 24 located along the bottom edge of bracket 20 are lifted free from engagement with corresponding sides of a square locking nut 23. Te bracket 20 while in this raised position, may then be selectively pivoted to an operative or inoperative position (FIGS. 1 and 4 respectively) where it may be lowered and locked into that position. Upon lowering bracket 20, the sides of opening 24 become engaged with corresponding sides of nut 23 as clip 26 progressively slides along inclined surface 27. As the bottom edge of bracket 20 comes to rest on the top surface of extension 15, the spring clip 26 snaps inwardly into engagement with ledge 29, thereby locking bracket 20 in the selected position.

Figure 7:
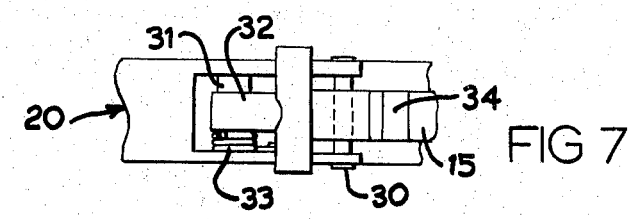
FIG. 7 is a view taken along line 7—7 in FIG. 6.

A second embodiment of my invention may be viewed in FIGS. 5-7.

In this particular embodiment, base 14 is substantially vertical, being affixed to a vertical portion along the rear end of a towing vehicle 11. Extension 15 is formed as an integral part of base 14 and extends outwardly therefrom to support bracket 20 and standard 12.

Standard 12 in this embodiment is semicircular, extending first downwardly from extension 15, then upwardly to conform somewhat to the toroid shape of ring 19 (FIG. 6). Pintle 16 is formed as an integral part of the semicircular configuration of standard 12 with ball 17 integrally formed at the upper end thereof.

Bracket 20 is also semicircular in configuration and is pivotably mounted to extension 15 for selective movement between the inoperative and operative positions shown by FIGS. 5 and 6 respectively. Bracket 20 is pivoted about the horizontal axis of a pin 30 which extends transversely through bracket 20 and extension 15.

Latching mechanism 21 includes an arm 32 pivotally mounted to bracket 20 by a pin 31, the axis of which is parallel to that of pin 30. A torsion spring 33 is utilized between bracket 20 and arm 32 to slightly bias arm 32 in the direction indicated by the arrow in FIG. 5. Arm 32 is utilized to lock bracket 20 at the inoperative operative position, by selectively engaging one of two successive complementary slots 34, 35 in extension 15.

To move bracket 20 from the inoperative position to the operative position, the operator simply pivots arm 32 away from engagement with slot 34, pivots bracket 20 to the operative position, then releases arm 32 to engage slot 35. Movement of bracket 20 from the operative position to the inoperative position is accomplished by repeating the above-described operation in reverse.

When bracket 20 is in an inoperative position, a ring 19 (FIG. 1 and 5) of a trailing vehicle may be fitted over ball 17 to encircle pintle 16. Bracket 20 may then be pivoted and locked into an operative position to form an enclosed link thereby preventing ring 19 from becoming disengaged from the hitch 10.

Figure 4:
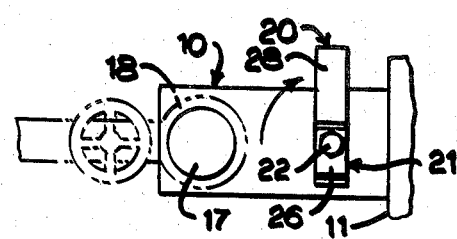
FIG. 4 is a plan view illustrating my invention with the locking mechanism in an inoperative position.

Further, in order to complete a couple between towing vehicle 11 and a trailing vehicle having a socket type hitch member 18, the bracket 20 is simply unlatched, pivoted away from ball 17, and locked in an inoperative position (FIGS. 4 and 5). Socket 18 may then be easily secured to ball 17 in the usual fashion.

It should be noted that the above-described operations of hitch 10 may be easily and quickly accomplished by hand without need for tools.

Modifications may obviously be made in the specific features shown and therefore the foregoing description is not intended to limit or to restrict the scope of this application, the invention being set out in the following claims.

What I claim is:

1. A vehicle hitch adapted for mounting to a towing vehicle to facilitate attachment to a trailing vehicle having either a ball-receiving socket member or a horizontal ring member on the forward end thereof, comprising:

a base support adapted for attachment to the rear of the towing vehicle;

a rearwardly protruding extension integral with said base support and extending therefrom in a substantially horizontal direction;

an upstanding standard at the rear end of said extension adapted to be encircled by a horizontal ring member;

a spherical ball fixed to the upper end of said standard adapted to be engaged by a ball-receiving socket member; said standard being centered relative to the ball and having cross-sectional dimensions in a horizontal plane which are less than the ball diameter;

an upright shaft affixed to the extension spaced from the upright standard;

a bracket pivotally mounted on the shaft for selective pivotal movement between a first angular position in which the bracket extends to the ball to prevent a socket member or a horizontal ring member from disengaging from the ball or standard and a second angular position to enable the socket member or the ring member to be readily disengaged from the ball or standard respectively and for selective axial movement between a down axial position adjacent the extension in which the bracket is prevented from pivoting on the shaft and an up axial position in which the bracket is pivotable;

a spring mounted on shaft engaging the bracket to bias the bracket to the down axial position; and a manually releasable element selectively engageable between the shaft and the bracket to normally prevent the bracket from being moved axially against the spring to the up axial position until manually released.

* * * * *